April 21, 1964 W. E. BLACKBURN ETAL 3,130,255
APPARATUS FOR DETECTING BLOOD SPOTS IN EGGS
Original Filed Nov. 1, 1955 3 Sheets-Sheet 1
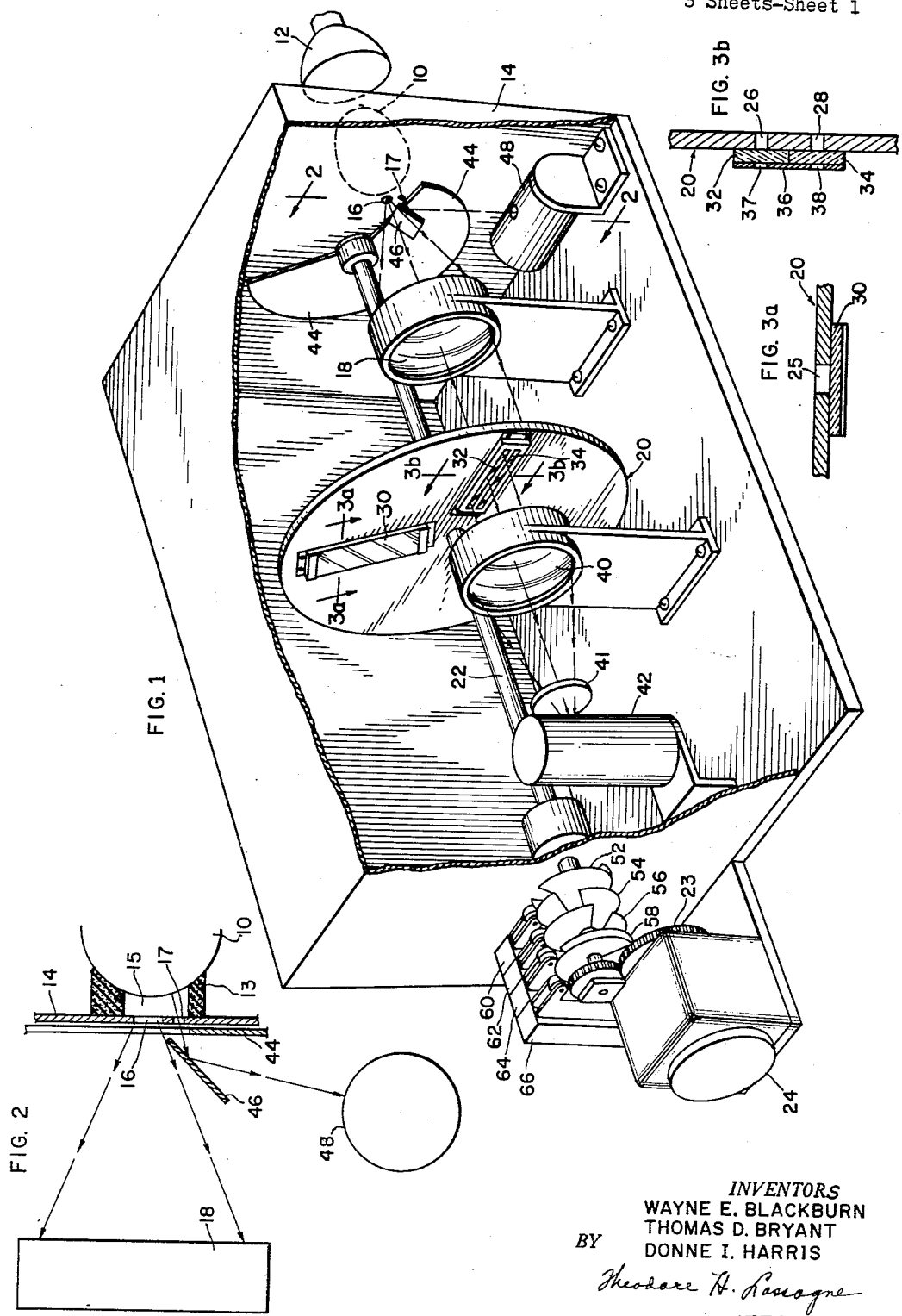
INVENTORS
WAYNE E. BLACKBURN
THOMAS D. BRYANT
BY DONNE I. HARRIS
Theodore H. Lassagne
ATTORNEY

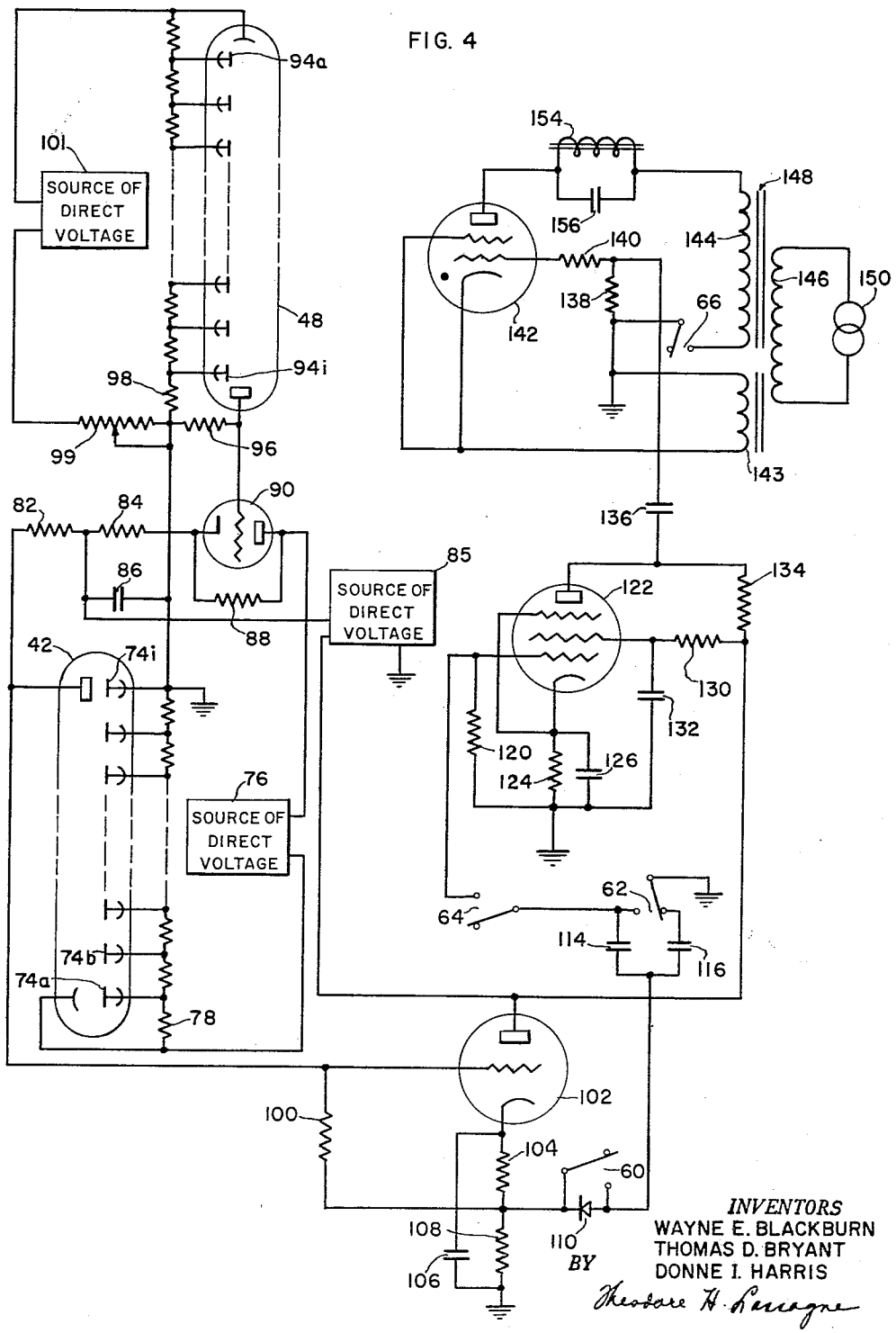

April 21, 1964  W. E. BLACKBURN ETAL  3,130,255
APPARATUS FOR DETECTING BLOOD SPOTS IN EGGS
Original Filed Nov. 1, 1955  3 Sheets-Sheet 3

INVENTORS
WAYNE E. BLACKBURN
THOMAS D. BRYANT
DONNE I. HARRIS
BY
*Theodore H. Lasagna*
ATTORNEY United States Patent Office 3,130,255
Patented Apr. 21, 1964

3,130,255
APPARATUS FOR DETECTING BLOOD
SPOTS IN EGGS
Wayne E. Blackburn, Burbank, Thomas D. Bryant, Tujunga, and Donne I. Harris, Los Angeles, Calif., assignors to General Precision, Inc., a corporation of Delaware
Continuation of application Ser. No. 544,131, Nov. 1, 1955. This application Mar. 12, 1962, Ser. No. 181,222
8 Claims. (Cl. 88—14.1)

This invention relates to apparatus for detecting the presence of a particular material in a specimen, and it relates more particularly to apparatus for detecting blood spots in eggs.

This application is a continuation of copending application Serial No. 544,131, filed November 1, 1955, now abandoned in the name of Wayne E. Blackburn et al. and entitled Detecting Apparatus.

Eggs layed by chickens and other fowl often have blood spots in them. These blood spots do not in any way affect the edibility of the eggs. However, they do present an undesirable appearance to housewives and other potential users, when the shell is broken. For this reason, attempts have been made to sort eggs, so that eggs containing blood spots will not be delivered for sale in groceries and supermarkets. These attempts have not, in the past, proven to be completely successful.

The present invention provides improved apparatus for indicating the presence of a blood spot in an egg. In the practice of the invention, apparatus is provided for directing light through the egg being tested. In an embodiment to be described, the light passed through the egg is filtered to provide light at a particular first wavelength. The light passing through the egg at the first wavelength is different for an egg having a blood spot than for an egg which is free from blood. The embodiment to be described also provides means for filtering the light passed through the egg under test, so as to provide light at further wavelengths displaced from the first wavelength, and at which the amount of light is substantially the same whether or not the egg under test has blood spots or not.

The embodiment also includes photoelectric means which produces electrical signals in response to the light passed through the egg under test at the first, and at the further wavelength. The electrical signals produced thereby have characteristics dependent upon the amount of light passed through the egg at the different wavelengths. The signals produced by the photoelectric means are compared in an appropriate comparator circuit. On the basis of this comparison, an electrical control signal is produced which has a first amplitude for an egg with a blood spot, and which has a second amplitude for an egg which is free of blood.

In a particular embodiment of the invention to be described, the control signal produced by the photoelectric means is utilized to actuate a solenoid. This solenoid, in turn, actuates a suitable mechanism by which eggs with blood spots are separated from the eggs which are free of blood spots.

By use of the apparatus to be described, only eggs which are free of blood may be packaged for sale to the public in the retail outlets. The eggs having blood spots in them can be used, for example, by baking companies for making food products, such as bread and cake; or by companies for making food mixes for household pets, such as dogs and cats.

In the drawings:

FIGURE 1 is a perspective view somewhat schematically illustrating the construction of apparatus constituting one embodiment of the invention for testing eggs, the apparatus housing being shown partially broken away to reveal the apparatus in some detail;

FIGURE 2 is a fragmentary sectional view substantially on the line 2—2 of FIGURE 1 and illustrating in further detail certain components of the apparatus shown in FIGURE 1;

FIGURES 3A and 3B are sectional views taken substantially on the lines 3A—3A and 3B—3B, respectively, of FIGURE 1 and illustrating in further detail the construction of certain components constituting an important part of the invention and included in the apparatus shown in FIGURE 1;

FIGURE 4 is a circuit diagram schematically illustrating the electrical system associated with and controlling the apparatus of FIGURE 1;

Figure 5:
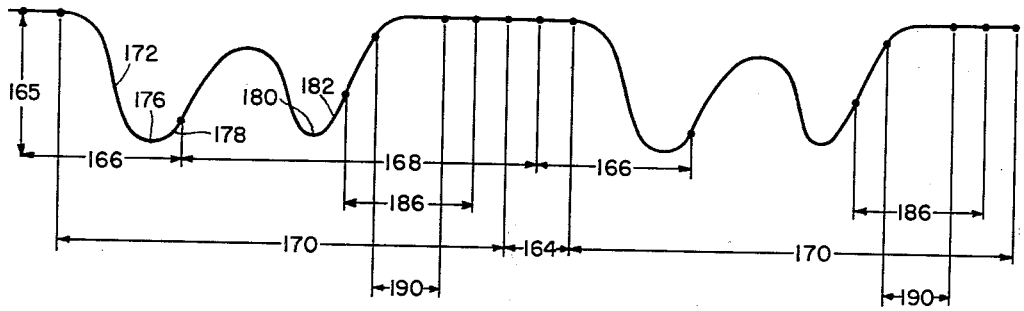
FIGURE 5 is a timing diagram showing the operational sequence of certain components of the apparatus of FIGURE 1 during the testing of an egg.

In the embodiment of the invention shown in FIGURES 1–4, inclusive, an egg 10 undergoing test is illustrated as positioned between a light source 12 and a housing 14. The egg 10 may be supported within a retainer 13 (FIGURE 2) made from a suitable material such as foam rubber and having an aperture 15. An aperture 16 is provided in a vertical wall of the housing 14 in a direct line with the egg 10 and the aperture 15. The aperture 16 serves to admit to the housing the light passing from the source 12 through the egg 10. A second aperture 17 is also provided in the housing 14 at a position slightly below the aperture 16 for reasons which will be described in detail subsequently.

A lens 18 (FIGURES 1 and 2) is disposed within the housing 14 in the light path, and this lens serves to focus and collimate the light passing through the egg 10 into a light beam having substantially parallel rays. The lens 18 is positioned in the housing 14 between the aperture 16 and a rotatable disc generally indicated as 20 (FIGURES 2, 3A and 3B). The disc 20 is mounted on a shaft 22 (FIGURE 1) for rotation through suitable gearing 23 by a motor 24 preferably disposed outside the housing 14. The disc 20 has a first aperture 25 (FIGURE 3A), and it also has second apertures 26 and 28 (FIGURE 3B) paired in a manner which will be described in detail subsequently. The first aperture 25 and second apertures 26 and 28 are preferably disposed at equal distances from the center of the shaft 22 along lines extending radially from the shaft.

A filter 30 (FIGURES 1 and 3A) is suitably attached to the disc 20 at the front face of the disc so as to cover the first aperture 25. The filter 30 is adapted to pass light at a suitable wavelength, such as approximately 575 millimicrons, and to trap light at other wavelengths between approximately 550 and 600 millimicrons. The filter 30 is provided with relatively sharp characteristics such that it passes light only at 575 millimicrons and in a very small range of wavelengths on either side of 575 millimicrons.

A pair of filters 32 and 34 (FIGURES 1 and 3B) are suitably attached to the disc 20 at positions in front of the apertures 26 and 28, respectively. The filter 32 is adapted to pass light at a wavelength of approximately 565 millimicrons and in a small band on either side of that wavelength. The filter 34 has relatively sharp characteristics and is adapted to pass light at a wavelength of approximately 585 millimicrons and in a very small band on either side of the latter wavelength. A masking bar 36 (FIGURE 3B), having apertures 37 and 38 therein, is suitably attached to the disc 20 and is disposed in front of the filters 32 and 34. The apertures 37 and 38 respectively correspond in position to the apertures 26 and 28 in the disc 20.

A lens 40 (FIGURE 1) is disposed on the opposite side of the disc 20 from the lens 18. The center of the lens 40 is separated from the center of the shaft 22 by a radial distance corresponding to the radial distance between the center of the disc 20 and the centers of the first aperture 25 and of the apertures 26 and 28. The lens 40 is provided with characteristics for converging the collimated beam of light passing through the apertures 25, 26 and 28 from the lens 18.

A filter 41 is disposed to receive the converging rays of light travelling from the lens 40. The filter 41 is provided with characteristics for trapping any light in the range above approximately 600 millimicrons and below approximately 550 millimicrons which might have been passed by the filters 30, 32 and 34. The filter 41, therefore, traps all light passed by the filters 30, 32 and 34, except for the light passed thereby in the range between 550 and 600 millimicrons.

A photo-tube 42 is disposed within the housing 14 to receive the light passing through the filter 41. This photo-tube 42 may be of the photo-multiplier type manufactured, for example, by the Radio Corporation of America and designated as "1P21." It should be appreciated, however, that any photosensitive pick-up can be substituted for the photo-tube 42.

In addition to the disc 20, a shutter 44 (FIGURES 1 and 2) is mounted on the shaft 22 at a position within the housing 14. The shutter 44 is mounted on the shaft 22 at a position near the apertures 16 and 17 (FIGURE 2) to block the passage of light passing through those apertures into the housing 14. The shutter 44 is open along a sector corresponding to that defined by the filters 30, 32 and 34, such that light is permitted to pass to the filters.

A mirror 46 is positioned within the housing 14 on the opposite side of the shutter 44 to the apertures 16 and 17, and on the rear side of the shutter 44 with respect to those apertures. The mirror 46 is disposed to reflect downwardly to a photo-tube 48 the light passing through the aperture 17 and through the open sector of the shutter 44.

The photo-tube 48 may, for example, be a photo-multiplier type "6328" manufactured by the Radio Corporation of America. It should be appreciated, however, that any suitable photosensitive pick-up can be substituted for the photo-tube 48.

A plurality of cams 52, 54, 56 and 58 are mounted on the shaft 22 (FIGURE 1) at a position outside the rear wall of the housing 14. The cams 52, 54, 56 and 58 are provided with lobes for respectively actuating switches 60, 62, 64 and 66 in each cycle of cam rotation. The switches may be spring-biased single-pole double-throw microswitches.

The photo-multiplier photo-tubes 42 and 48 are included in the electrical circuitry shown in FIGURE 4. As shown in FIGURE 4, the photo-tube 42 is provided with an anode, a cathode, and a plurality of dynodes. The cathode of the photo-tube 42 is connected to the negative terminal of a suitable source of direct current potential indicated in block form as 76 in FIGURE 4. The potential source 76 is preferably provided with regulated characteristics to obtain a stable output voltage. The dynodes of the photo-multiplier tube 42 also receive negative potentials of decreasing value, by a usual potential-divider arrangement including resistors, such as the resistor 78. The resistors forming the potential-divider may each have a resistance, for example, of 50,000 ohms. The dynode 74i closest to the anode of the photo-tube 42 is grounded.

A resistor 82 is connected to the anode of the photo-tube 42 and to the positive terminal of a direct current potential source 85. The negative terminal of the source 85 is grounded. The positive terminal of the source 85 is also connected to a grounded resistor 86 and to a resistor 84. The resistances of the resistors 82 and 84 may respectively have suitable values, such as approximately 5 megohms and 62,000 ohms. The capacitor 86 may have a capacity, for example, of 20 microfarads.

A resistor 88 having a suitable value, such as approximately 0.5 megohm, is connected to the resistor 84 and to the positive terminal of the source 76. The source 76 is adapted to interpose a potential of approximately 1,000 volts, for example, between the resistors 78 and 88. The source 85 applies a potential of the order, for example, of 108 volts between the common terminal of the resistors 82 and 84 and ground. In this manner, the anode of the photo-tube 42 has a positive potential with respect to the grounded dynode 74i.

The cathode and anode of a triode 90 are connected across the resistor 88. The triode 90 may be of the type "6S4" manufactured by the Radio Corporation of America. The control grid of the triode 90 is connected to the anode of the photo-tube 48. As illustrated in FIGURE 4, the photo-tube 48 also includes a plurality of dynodes disposed at spaced intervals between its anode and cathode. The dynode closest to the cathode of the photo-tube 48 is indicated as 94a and the dynode closest to the anode is indicated as 94i.

A pair of resistors 96 and 98 are connected in series between the anode of the photo-tube 48 and its dynode 94i. The resistor 96 may have a suitable value such as approximately 2 megohms, and the resistor 98 may have a suitable value such as between 50 and 500 kilo-ohms. The common terminal between the resistors 96 and 98 is grounded. Resistors similar in value to the resistor 98 are also connected as a potential-divider between the other dynodes of the photo-tube 48, and between the dynode 94i and the cathode of the photo-multiplier tube.

A variable resistor 99 is connected between the positive terminal of a direct current potential source 101 and ground. The negative terminal of the source 101 is connected to the cathode of the photo-multiplier tube 48. The source 101 may produce a voltage, for example, of 1,000 volts, and the source is preferably provided with regulated characteristics for stabilizing the voltage.

The anode of the photo-multiplier tube 42 is also connected to the control grid of a triode 102, the control grid being connected to a resistor 100. The resistor 100 may have a suitable value, such as approximately 1 megohm, and the triode 102 may be of a type designated, for example, "6C4." The anode of the triode 102 is connected directly to a positive terminal of the potential source 85. The cathode of the triode 102 is connected to a resistor 104 having a suitable value such as approximately 180 ohms, and the cathode is also connected to a grounded capacitor 106 having a suitable value such as approximately 1 microfarad. The resistor 104 is connected to a grounded resistor 108 having a value such as approximately 10 kilo-ohms. The resistor 100 is connected to the common junction of the resistors 104 and 108.

The common junction of the resistors 104 and 108 is also connected to the movable contact of the switch 60 (also shown in FIGURE 1) and to the cathode of a diode 110. No electrical connection is made to one of the stationary contacts of the switch 60. The other stationary contact of the switch 60 has a common connection with the anode of the diode 110 and with a pair of capacitors 114 and 116. Connections are respectively made from the capacitors 114 and 116 to the first and second stationary contacts of the switch 62, the movable contact of which is grounded. Each of the capacitors 114 and 116 may have a suitable value such as approximately 1 microfarad.

The capacitor 114 is also connected to the movable contact of the switch 64. No electrical connection is made to one of the stationary contacts of the switch 64. However, a connection is made from the other stationary contact of the switch to a resistor 120, and to the control grid of a pentode 122. The resistor 120 is grounded, and it has a suitable value, such as 1 megohm.

The pentode 122 may be of the type designated "6AU6." The cathode and suppressor grid of the pentode 122 have common connections with first terminals of a resistor 124 and a capacitor 126. The resistor 124 and capacitor 126 may respectively have values, for example, of 2100 ohms and 200 microfarads. The second terminals of the resistor 124 and of the capacitor 126 are grounded. The screen electrode of the pentode 122 is connected to a resistor 130 which, in turn, is connected to the positive terminal of the source 85. This resistor may have a resistance, for example, of 1.2 megohms.

The positive potential applied to the screen grid of the pentode 122 is smoothed by the action of a grounded capacitor 132 which is connected to the screen grid and which has a suitable value, such as approximately 20 microfarads. A positive potential is also applied to the anode of the pentode 122 from the potential source 85 through a resistor 134. The resistor 134 may have a value, for example, of 0.47 megohms. The anode of the pentode 122 is coupled through a capacitor 136 and through a limiting resistor 140 to the control grid of a gaseous discharge device, such as a gas-filled tube 142. The junction of the capacitor 136 and resistor 140 is connected to a grounded resistor 138. The capacitor 136 and resistor 138 may respectively have suitable values such as approximately 0.22 microfarad and 2.2 megohms. The resistor 140 may have a suitable value such as approximately 2 megohms. The gas-filled tube 142 may be of the type designated "2D21."

The cathode and suppressor grid of the gas-filled tube 142 are connected to one terminal of a transformer secondary winding 143, the other terminal of which is grounded. The movable contact of the switch 66 is also grounded. No electrical connection is made to one of the stationary contacts of the switch 66. The other stationary contact of the switch 66 is connected to one terminal of a further transformer secondary winding 144. The secondary windings 143 and 144 are included with a primary winding 146 in a transformer indicated generally as 148. The primary winding 146 is connected across a usual alternating current source 150, such as, for example, a 60 cycle and 115 volt source.

A solenoid coil 154 is connected between the second terminal of the secondary winding 144 and the anode of the tube 142. The solenoid coil may form a portion of a solenoid which may be a type "223-7" manufactured by the Leach Relay Company of Los Angeles, California. A capacitor 156, having a suitable value such as approximately 12 microfarads, is connected in parallel with the solenoid coil 154. The capacitor serves to prolong the response of the solenoid coil each time it is energized. When the solenoid coil 154 is energized the associated solenoid actuates an appropriate mechanism to reject the egg under test, when it has been found to contain a blood spot.

The light from the source 12 (FIGURE 1) is directed towards the egg 10 disposed between the source and the aperture 16 in the housing 14. The egg transmits a different amount of light at each wavelength in a relationship which will be described in detail subsequently. The light transmitted by the egg then passes through the aperture 16 to the lens 18, the lens 18 serving to collimate the light and to direct the light towards the disc 20.

Since the disc 20 is mounted on the shaft 22, the disc is rotated by the motor 24. As the disc rotates, the first aperture 25 (FIGURE 3A) and the second apertures 26 and 28 (FIGURE 3B) alternately move into position for receiving the light passing through the lens 18. The light passing through the first aperture 25 is directed to the filter 30 (FIGURES 1 and 3A) which passes the light in the region at and near the wavelength of approximately 575 millimicrons and prevents passage of light in all other wavelengths between 550 and 600 millimicrons.

Shortly after the rotational movement of the disc to bring the first aperture 25 into position for passing the light, the disc 20 rotates into position such that the light is able to pass through the apertures 26 and 28 to the filters 32 and 34 (FIGURES 1 and 3B). The filter 32 passes light in the wavelength at and near approximately 565 millimicrons, and the filter 34 passes light at and near the wavelength of approximately 585 millimicrons. The apertures 26 and 28 have substantially equal areas, so that substantially equal weighting effects are imparted by the filters 32 and 34 to the light passing towards the lens 40. This causes the light passing to the lens 40 when the filters 32 and 34 are in position to have an intensity equal to the average intensity of the light transmitted by the egg 10 at the wavelengths of approximately 565 and 585 millimicrons.

The light transmitted by the filter 30 and by the filters 32 and 34 is directed towards the lens 40, which produces a converging action on the light and directs it towards the photo-tube 42. Before the light reaches the photo-tube 42 from the lens 40, it passes through the filter 41. As mentioned above, the filter 41 operates to trap the light in the wavelengths below approximately 550 millimicrons and above approximately 600 millimicrons so that only light in the range of approximately 550 to 600 millimicrons can pass to the photo-tube 42. In this way, a signal is produced by the photo-tube 42 when the filter 30 is in position having an intensity dependent upon the amount of light transmitted by the egg 10 at and near the wavelength of approximately 575 millimicrons. At the next instant, and when the filters 32 and 34 are in position, the photo-tube 42 produces a signal having an intensity proportional to the average amount of light transmitted by the egg 10 at and near the wavelengths of approximately 565 and 585 millimicrons.

The light passed by the egg 10 also passes through the aperture 17 in the housing to the mirror 46 and thence to the phototube 48 (FIGURE 2), by reflection by the mirror. The light is introduced to the photo-tube 48 slightly before the time that it is introduced to the photo-tube 42, because of the operation of the shutter 44 in controlling the times at which the light is able to enter into the housing 14.

The amount of light passing through the egg 10 to the photo-tube 48 is dependent upon the color of the shell and upon the density of the egg. For example, a brown egg passes less light than a white egg. The amount of light passing through the egg 10 to the photo-tube 48 is proportional to the amount of light passing through the egg 10 to the photo-tube 42. When the light passes through a brown egg, a relatively low intensity of light reaches the photo-tube 48. The photo-tube 48 responds to the intensity of light transmitted to it to produce a negative signal across the resistor 96. This negative signal has an amplitude proportional to the intensity of light incident on the photo-tube 48, and the negative signal is introduced to the control grid of the triode 90 to control the current through the triode 90.

As previously described, a brown egg transmits less light than a white egg. This causes the negative signal introduced by the photo-tube 48 to the control grid of the triode 90 for a brown to have a smaller amplitude than the negative signal introduced to the control grid for a white egg. This causes the triode 90 to be more conductive for a brown egg than for a white egg. Since the impedance between the plate and cathode of the triode 90 decreases with increased current flow through the tube, the voltage produced across the triode 90 for a brown egg is less than that produced across the tube for a white egg.

The voltage applied between the cathode and anode of the photo-tube 42 is dependent upon the voltage developed between the cathode and plate of the triode 90. As previously described, the voltage developed across the triode 90 is less for a brown egg than for a white egg. This causes a greater voltage to be applied between the cathode and anode of the photo-tube 42 for a brown egg than for a white egg. The reason for this is that the voltage across the triode 90 is in effect subtracted from the voltage applied between the anode of the triode 90 and the cathode of the photo-tube 42 so as to provide the true potential between the cathode and anode of the photo-tube 42.

By applying an increased voltage between the cathode and the anode of the photo-tube 42 for a brown egg than for a white egg, compensation is provided for differences in the intensities of the light transmitted by brown and white eggs. For a brown egg, the amount of light transmitted by the egg is relatively low, but the voltage applied between the cathode and anode of the photo-tube 42 is relatively high. For a white egg, the amount of light transmitted by the egg is relatively high, but the voltage applied between the cathode and anode of the photo-tube 42 is relatively low. This causes the signals produced by the photo-tube 42 for each egg to be substantially independent of the color of the shell and of the density of the egg at wavelengths of approximately 565, 575 and 585 millimicrons.

The signals produced by the photo-tube 42 are introduced to the grid of the triode 102 to control the flow of current through the triode. In each revolution of the disc 20, a first signal is produced by the photo-tube 42 when the filter 30 is in position and corresponding to the light passed to the photo-tube at a wavelength of approximately 575 millimicrons. A second signal is produced by the photo-tube 42 when the filters 32 and 34 move into position and corresponding to the average amount of light passed to the photo-tube at the wavelengths of approximately 565 and 585 millimicrons. The two signals are produced by the photo-tube 42 in each revolution of the disc 20, and the signals are introduced sequentially to the control grid of the triode 102 to control the flow of current through that triode.

Figure 6:
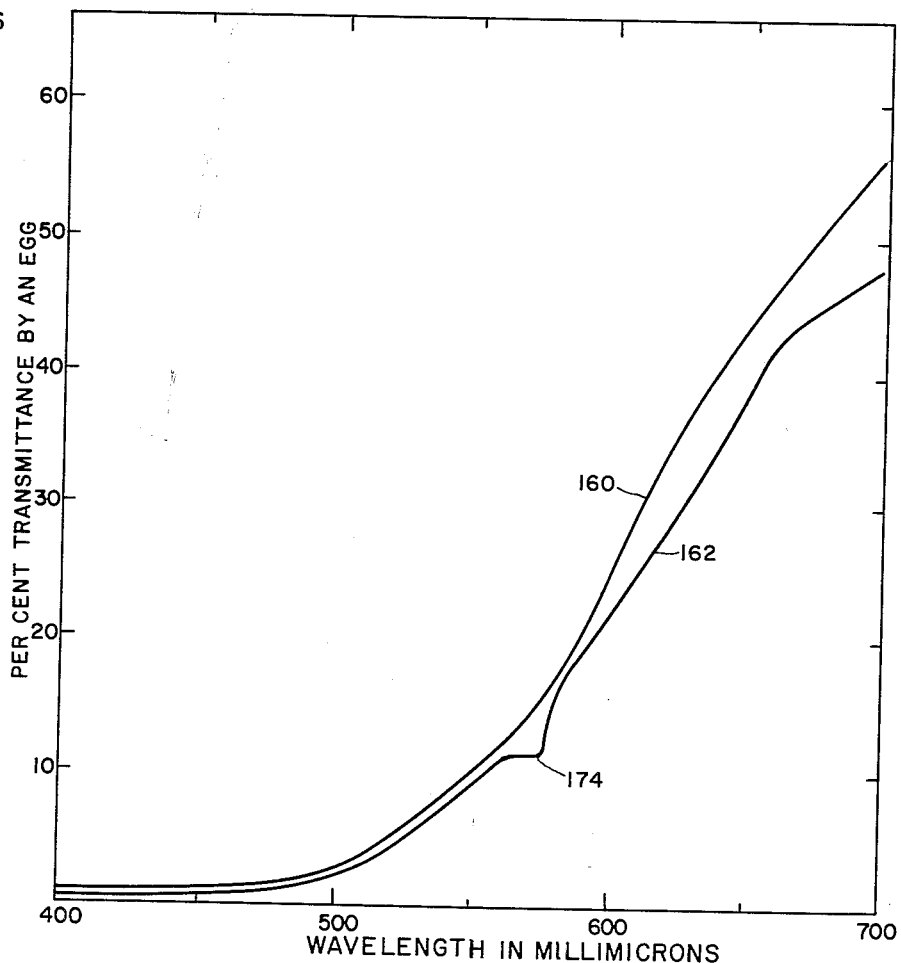
FIGURE 6 is a diagram including curves illustrating the transmission of light at different wavelengths by eggs having blood spots in comparison to the transmission by eggs having no blood spots.

The curve 160 in FIGURE 6 indicates the light transmission characteristics of the egg 10 when no blood spot exists in the egg. The curve 162 in FIGURE 6, on the other hand, indicates the light transmission characteristics of the egg 10 when the egg contains a blood spot. It will be seen from the curves 160 and 162 that the signal produced by the photo-tube 42 in response to light at the wavelengths of approximately 565 and 585 millimicrons is substantially independent of whether or not the egg under test contains blood spots. This is certainly true when the signal is compensated by the circuitry of the photo-tube 48 for differences in the color of the shell and in the density of the egg.

The triode 102 is normally biased into a conductive state. This causes current to flow through the cathode resistors 104 and 108. This flow of current through the cathode resistors produces a positive voltage of approximately 100 volts across the resistor 108. The voltage produced across the resistor 108 is smoothed and regulated by the action of the capacitor 106. During the flow of current through the resistor 108, the movable contact of the switch 60 engages the lower stationary contact in FIGURE 4, as illustrated at 164 in FIGURE 5. This causes the diode 110 to be effectively short-circuited so that the voltage produced across the resistor 108 is able to provide a charging current for the capacitors 114 and 116.

As indicated at 166 in FIGURE 5, the movable contact of the switch 62 engages the left stationary contact of the switch during part of the time that the diode 110 is short-circuited by the switch 60. This causes charging current to flow into the capacitor 114. The current flowing into the capacitor 114 charges the capacitor to a voltage approaching the potential across the resistor 108. That is, approximately 100 volts in the example under consideration. This voltage is indicated at 165 in FIGURE 5.

The movable contact of the switch 62 in FIGURE 4 is then moved into engagement with the right stationary contact of the switch during a subsequent part of the time that the diode 110 is short-circuited by the switch 60. This is indicated by a comparison between the time portions 168 and 164 in FIGURE 5 and by an overlap between the time portions. This engagement by the movable contact of the switch 62 with its right stationary contact causes charging current to flow into the capacitor 116. This latter current charges the capacitor 116 to a voltage substantially equal that to the voltage produced across the resistor 108 which, in the example under consideration, is approximately 100 volts, as indicated at 165 in FIGURE 5.

It is to be understood that the switching operations described above occur during each revolution of the shaft 22 in FIGURE 1. During part of each revolution, the movable contact of the switch 60 in FIGURES 1 and 4 is moved into engagement with the upper stationary contact of the switch. This latter engagement is indicated at 170 in FIGURE 5. During the time that the movable contact of the switch 60 engages the upper stationary contact of the switch in FIGURE 4, the short-circuit normally produced across the diode 110 is removed. The diode is now able to prevent the flow of charging current from the potential across the resistor 108 to either of the capacitors 114 and 116, so that the capacitors cannot be further charged.

The signals produced by the photo-tube 42 are introduced to the control grid of the triode 102 during a portion of the time that the short-circuit across the diode 110 is removed. As previously described, one of the signals indicates the amount of light passing through the egg 10 at approximately 575 millimicrons; and the other indicates the average amount of light passing through the egg at approximately 565 and 585 millimicrons. Both of these signals tend to reduce the current flow through the triode 102 and through its cathode resistors 104 and 108. Since the flow of current through the resistor 108 is reduced by each of these signals, the capacitors 114 and 116 are discharged through the diode 110 a proportionate amount.

It will be seen from FIGURE 5 that the time interval 170 overlaps a major portion of the time interval 166 and of the time interval 168 in each revolution of the shaft 22. This indicates that the movable contact of the switch 62 engages the left stationary contact of the switch during a portion of the time that the diode is not short-circuited. It further indicates that the movable contact of the switch 62 engages the right stationary contact of the switch during the remaining portion of the time that the diode 110 is not short-circuited.

When the movable contact of the switch 62 engages the left stationary contact of the switch in FIGURE 4 during the time portion 170 in FIGURE 5, the capacitor 114 discharges through the diode 110 into the resistor 108 down to a value dependent upon the signal introduced to the grid of the triode 102 at that time. The discharge of the capacitor 114 is indicated at 172 in FIGURE 5.

Less light passes through an egg having a blood spot than an egg not having a blood spot at a wavelength of approximately 575 millimicrons. This is indicated at 174 in the curve 162 shown in FIGURE 6 for an egg having a blood spot. The increased absorption may be appreciated from a comparison between the portion 174 of the curve 162 and the corresponding portion of the curve 160. Because of the increased absorption of light at a wavelength of approximately 575 millimicrons for an egg having a blood spot, the corresponding signal introduced to the control grid of the triode 102 is smaller in amplitude for an egg having a blood spot than for an egg not having a blood spot. This causes the current flowing through the triode 102 to have a greater value for an egg having a blood spot than for an egg not having a blood spot.

Because of the increased flow of current through the triode 102 for an egg having a blood spot, an increased potential is produced across the resistor 108. This increased potential across the resistor 108 for an egg having a blood spot causes the discharge current flowing from the capacitor 114 through the resistor 108 for an egg with a blood spot to be small in comparison with the discharge current produced for an egg without a blood spot. Since the capacitor 114 does not discharge as much for an egg with a blood spot as for an egg without a blood spot, the voltage across the capacitor remains at a higher value for an egg with a blood spot than for an egg without a blood spot.

As will be seen, the capacitor 114 continues to discharge during the movement of the filter 30 past the beam of light passing through the lens 18. The cam switch 62 is actuated to its left hand contact at this particular instant to connect the capacitor 114 into the circuit and to disconnect the capacitor 116. When the filter 30 has moved to a position fully in line with the light from the lens 18, the capacitor 114 has discharged to its lowest voltage. This is indicated at 176 in FIGURE 5. Thereafter, the triode 102 starts to return to its full conductivity and the potential across the resistor 108 again rises towards 100 volts. This latter action is indicated at 178 in FIGURE 5.

Although the potential across the resistor 108 may rise to a value greater than the potential across the capacitor 114 during the potential rise at 178, the capacitor 114 does not receive any additional charge. This is due to the fact that the diode 110 is now in circuit and prevents the flow of any charging current to the capacitor, this being because the cam switch 60 has moved to its open position at this particular time.

When the movable contact of the switch 62 engages the right stationary contact during the time period 170, the capacitor 116 is caused to discharge through the resistor 108, as mentioned above. This discharge of the capacitor 116 is to substantially the same value whether or not a blood spot exists in the egg undergoing test. This results from the fact that the signal produced by the photo-tube 42 in response to light at the wavelengths of approximately 565 and 585 millimicrons remains substantially constant whether or not a blood spot exists in the egg being tested, as seen by the curve 160 in FIGURE 6.

The capacitor 116 becomes discharged to a minimum potential indicated at 180 in FIGURE 5. Thereafter, the current through the triode 102 starts to increase and the potential across the resistor 108 starts to rise as the filters 32 and 34 move past the lens 18. This rise in potential across the resistor 108 is indicated at 182 in FIGURE 5. However, as noted above, the position of the switch 60 places the diode 110 in circuit which prevents this rise in potential from affecting the charge of the capacitor 116.

As previously indicated, the movable contact of the switch 62 engages its right stationary contact during the time interval 168 in FIGURE 5. During a portion of the time interval 168, the movable contact of the switch 64 engages the upper stationary contact of the switch, as indicated at 186 in FIGURE 5. When the movable contacts of the switches 62 and 64 respectively engage the right and upper stationary contacts thereof, a continuous circuit is established which includes the capacitors 114 and 116 in a series circuit. The combined charges across the capacitors 114 and 116 are now caused to discharge through the resistor 120, and the current flowing through the resistor is dependent upon the relative amounts of charges in the capacitors 114 and 116.

For an egg having no blood spot, the charge in the capacitor 116 is substantially equal to the charge in the capacitor 114, or may even be slightly greater than the charge in the capacitor 114. For a condition of substantially equal charges in the capacitors 114 and 116, the charges in the capacitors effectively neutralize one another, and this prevents any current from flowing through the resistor 120. Since no current flows through the resistor 120 under this condition, the voltage produced across the resistor is substantially zero, so that the normal current flow through the pentode 122 is maintained.

It may sometimes happen that the charge in the capacitor 116 may slightly exceed the charge in the capacitor 114 for an egg having no blood spot. When this occurs, the resulting current flow through the resistor 120 is in a direction to produce a positive voltage across the resistor which, in turn, serves to increase the flow of current through the pentode 122.

It will be seen, therefore, that the current through the pentode 122 is maintained or even increased when an egg having no blood spot is under test. So long as the current flow through the pentode 122 is maintained, its anode potential is held at a relatively low value, due to the voltage drop across the resistor 134. As long as the potential of the pentode 122 is held at the relatively low value, the gaseous discharge tube 142 is held in its state of non-conductivity. This means that for eggs which do not have a blood spot, no current flows through the solenoid coil 154 to energize the solenoid. Therefore, the solenoid cannot be energized when the egg under test is free from blood spots.

A different result is obtained, however, when the egg under test does include a blood spot. As previously described, the capacitor 114 does not discharge as much through the resistor 108 for an egg having a blood spot as for an egg not having a blood spot. This causes the charge remaining in the capacitor 114 to be greater for an egg having a blood spot than for an egg not having a blood spot. For this reason, the charge in the capacitor 114 is greater than the charge in the capacitor 116 when the egg under test has a blood spot.

Because of the increased charge in the capacitor 114 with respect to the charge in the capacitor 116 when the egg under test includes a blood spot, a current flows through the resistor 120 when the switch 64 is moved to its upper contact, and when the switch 62 engages its right hand contact. The current flow through the resistor 120 is in a direction to produce a negative voltage across the resistor which, in turn, tends to limit the flow of current through the pentode 122.

This limiting of the current through the pentode 122 causes the potential of its anode to rise which, in turn, causes a positive firing signal to pass through the capacitor 136 to the grid of the gaseous discharge tube 142. At this time, the movable contact of the switch 66 engages its right stationary contact in FIGURE 4, as indicated at 190 in FIGURE 5. This permits an alternating current exciting potential to be introduced to the anode of the tube 142.

Because of the particular phase relationships of the alternating current voltages across the secondary windings 143 and 144, a positive half-cycle of voltage is applied to the cathode of the gaseous discharge tube 142 at the time that a positive half-cycle of voltage is applied to the anode of the tube. The positive voltage of the cathode effectively provides a negative bias to prevent the flow of current through the tube 142 during the positive half-cycle of anode voltage. This negative bias prevents the tube 142 from becoming conductive, except upon the introduction of the firing signal to its control grid through the capacitor 136. Therefore, the tube 142 does not have a tendency to be triggered into a state of conductivity by spurious signals such as noise. However, the introduction of the aforementioned positive firing signal to its control grid does, in fact, permit the tube 142 to be triggered into a state of conductivity.

As previously described, a positive firing signal is produced at the anode of the pentode 122 when an egg having a blood spot is under test. This signal passes through the capacitor 136 to the control grid of the gaseous discharge tube 142, and it has sufficient amplitude to overcome the negative bias and trigger the gaseous discharge tube 142 into a state of conductivity.

Upon the triggering of the gaseous discharge tube 142 into a state of conductivity, current flows through the solenoid coil 144 to energize the solenoid. During the half-cycle in which the tube 142 is conductive, current flows through the capacitor 156 to charge the capacitor. The capacitor 156 then discharges through the solenoid coil 154 during the next half-cycle, so that the solenoid coil may be held continuously energized. The associated solenoid then actuates a suitable trip circuit to cause the egg under test to be rejected, or it may activate a suitable alarm circuit to permit the manual removal of the particular egg.

The apparatus described above has several important advantages. It provides an indication as to the presence of a blood spot in an egg under test by comparing the amount of light passing through the egg for at least two different wavelengths. At a critical wavelength such as approximately 575 millimicrons, the amount of light transmitted by the egg varies in accordance with the presence or absence of blood spots in the egg. At other wavelengths, the amount of light passing through the egg remains substantially constant whether or not there are blood spots in the egg.

In the embodiment of the invention described above, two measurements are made to obtain an average indication for comparison with the amount of light passed by the egg at the critical wavelength. These two measurements are made at wavelengths above and below the critical wavelength and differing from the critical wavelength by substantially equal amounts. By taking an average of the two measurements, an indication is obtained which is substantially equal to the indication obtained at the critical wavelength when no blood spot occurs in the egg. This causes accurate measurements to be obtained easily by simple circuitry.

It should be appreciated, however, that it is not necessary to obtain an average of two measurements at wavelengths straddling the critical wavelength, as in the example described above. For example, a single measurement of the light passed by an egg at approximately 585 millimicrons could be compared with the amount of light passed by the egg at the critical wavelength of approximately 575 millimicrons. By properly attenuating the measurement obtained at approximately 585 millimicrons, a direct comparison could be made between the indications at approximately 575 and 585 millimicrons. This comparison would indicate the presence or absence of blood spots in an egg in a manner similar to that described above.

The embodiment shown in FIGURES 1-4, inclusive, and described fully above has other important advantages. This embodiment uses only a single photo-tube such as the tube 42 in FIGURE 4 to make the measurements of the amount of light transmitted by an egg at the different wavelengths such as approximately 565, 575 and 585 millimicrons. By using only a single photo-tube to obtain the measurements at the different wavelengths, errors resulting from variations in the operating characteristics of different photo-tubes are eliminated. In this way, even the characteristics of the photo-tube 42 could vary with age without materially affecting the reliability of the indications obtained by the apparatus.

Another advantage is obtained from the use of the photo-tube 48. As described previously, the photo-tube 48 operates in conjunction with the photo-tube 42 to provide a compensation for differences in the amount of light transmitted by eggs having shells of different colors. By providing such a compensation, the measurements obtained by the apparatus are substantially independent of the colors of the egg shells and are dependent only upon the presence or absence of a particular material such as blood spots in the eggs.

While a particular embodiment of the invention has been described, modifications may be made. The following claims are intended to cover all such modifications as fall within the scope of the invention.

What is claimed is:

1. Apparatus for detecting the presence of a blood spot in an egg, which egg passes certain intensities of light at a first, second and third wavelength, said second wavelength being of the order of 575 millimicrons and said first and third wavelengths being displaced therefrom, the average intensity of light passed at the first and third wavelengths being substantially equal to the intensity of light passed at the second wavelength in the absence of a blood spot in said egg and being different in the presence of a blood spot, said apparatus including: a light source; means for supporting an egg to be tested in a position such that light from said light source passes through the egg; a first filter for passing light only in the region of said first wavelength; a second filter for passing light only in the region of said second wavelength; a third filter for passing light only in the region of said third wavelength; detector means for receiving the light passed through said filters, said detector means producing a first signal relating to the intensity of light passed through said second filter and producing a second signal relating to the average intensity of light passed through said first and third filters; and signal comparator means coupled to said detector and responsive to said first and second signals for producing a third signal having a first intensity when the egg to be tested contains a blood spot and having a second intensity when the egg to be tested is free from blood spot.

2. Apparatus for detecting the presence of a blood spot in an egg, which egg passes certain intensities of light at a first, second and third wavelength, said second wavelength being of the order of 575 millimicrons and said first and third wavelength being displaced therefrom, the average intensity of light passed at the first and third wavelengths being substantially equal to the intensity of light passed at the second wavelength in the absence of a blood spot in said egg and being different in the presence of a blood spot, said apparatus including: light producing means for providing light at least of said first, second and third wavelengths and for passing light through each egg being tested; detector means for receiving the light passed through the egg being tested and for producing a first signal relating to the intensity of light passed through said egg at said second wavelength and producing a second signal relating to the average intensity of light passed through said egg at said first and third wavelengths; and signal comparator means coupled to said detector and responsive to said first and second signals for producing a third signal having a first intensity when the egg under test contains a blood spot and having a second intensity when the egg under test is free from blood spots.

3. The apparatus defined in claim 1 and which includes means coupled to said detector for compensating at least one of said first and second signals for differences in the color of the shells of different eggs to be tested.

4. Apparatus for detecting the presence of a blood spot in an egg, which egg passes certain intensities of light at a first wavelength of substantially 565 millimicrons, a second wavelength of substantially 575 millimicrons, and a third wavelength of substantially 585 millimicrons, said second wavelength being intermediate said first and third wavelengths, the average intensity of the light passed at the first and third wavelengths being substantially equal to the intensity of light passed at the second intermediate wavelength in the absence of a blood spot in said egg, and being different in the presence of a blood spot, said apparatus including: a light source positioned with respect to an egg to be tested such that light from said light source passes through the egg; a first filter for passing light only in the region of said first wavelength; a second filter for passing light only in the region of said second intermediate wavelength; a third filter for passing light only in the region of said third wavelength, said first and third filters being of equal density; mounting means for said first, second and third filters; drive means mechanically coupled to said mounting means for selectively positioning said second filter and said first and third filters in the light path from said light source to pass light passed from said source through the egg to be tested; detector means for receiving the light passed through said filters, said detector means producing a first signal relating to the intensity of light passed through said second filter and producing a second signal relating to the average intensity of light passed through said first and third filters; first capacitor means; second capacitor means; selective switching means mechanically coupled to said drive means and electrically coupled to said detector means for selectively introducing said first signal to said first capacitor means to charge said first capacitor means to a value corresponding to the amplitude of said first signal and for selectively introducing said second signal to said second capacitor means to charge said second capacitor means to a value corresponding to the amplitude of said second signal; and further selective switching means mechanically coupled to said drive means and electrically coupled to said first and second capacitor means for producing a third signal in response to the charge differential on said first and second capacitor means, said third signal havin ga particular intensity when the egg under test contains a blood spot and having a different intensity when the egg under test is free from blood spots.

5. Apparatus for detecting the presence of a blood spot in an egg, which egg passes certain intensities of light at a first wavelength of substantially 565 millimicrons, at a second wavelength of substantially 575 millimicrons, and at a third wavelength of substantially 585 millimicrons, the second wavelength being intermediate the first and third wavelengths, the average intensity of light passed at the first and third wavelengths being substantially equal to the intensity of light passed at the second intermediate wavelength in the absence of a blood spot in the egg and being different in the presence of a blood spot, said apparatus including: a light source positioned with respect to an egg to be tested such that light from the light source passes through the egg; a first filter for passing light only in the region of said first wavelength; a second filter for passing light only in the region of said second intermediate wavelength; a third filter for passing light only in the region of said third wavelength, said first and second and third filters being of equal density; mounting means for said first and second filters for positioning the filters in the light path from said light source to pass light passed from said light source through the egg to be tested; detector means for receiving the light passed through said first and second and third filters, said detector means producing a first signal relating to the intensity of light passed through said second filter and producing a second signal relating to the average intensity of light passed through said first and third filters; signal comparator means; electric circuit means coupled to said detector means for introducing said first and second signals therefrom to said signal comparator means; and means coupled to said signal comparator means for producing a third signal having a particular value when the egg to be tested contains a blood spot and having a different value when the egg to be tested is free from blood spots.

6. Apparatus for detecting the presence of blood in eggs wherein the eggs pass substantially the same intensity of light at a first wavelength whether or not blood is in the eggs and wherein the eggs pass a different intensity of light at a second wavelength of the order of 575 millimicrons for eggs having blood spots than for eggs not having blood spots and wherein the first wavelength is different from the second wavelength, said apparatus including: means for positioning an egg to be tested in a particular path and in a position such that light passing along said particular path passes through the egg to be tested; detector means positioned for receiving light passing through the egg to be tested; means including a light source for causing light to pass along said particular path and through the egg to be tested and for causing the light passed through the egg in the region of said first wavelength and in the region of said second wavelength to be incident on said detector means, said detector means producing a first signal in response to light at said first wavelength and corresponding to the intensity of light passing through the egg under test at said first wavelength and further producing a second signal in response to light at said second wavelength and corresponding to the intensity of light passing through the egg at said second wavelength; electrical control circuit means coupled to said detector means for compensating at least one of said first and second signals for differences in the color of the shells of the different eggs to be tested; comparator means electrically coupled to said detector means and responsive to said first and second signals therefrom for producing a third signal having first characteristics when the egg under test contains a blood spot and having second characteristics different from said first characteristics when the egg under test is free from blood spots; and means coupled to said comparator means and responsive to said third signal therefrom for enabling eggs having blood to be segregated from eggs free from blood.

7. Apparatus for detecting the presence of blood in eggs wherein the eggs pass substantially the same intensity of light at a first wavelength whether or not blood is in the eggs and wherein the eggs pass a different intensity of light at a second wavelength of the order of 575 millimicrons for eggs having blood spots than for eggs not having blood spots, and wherein the first wavelength is different from the second wavelength, said apparatus including: a source providing light at least of said first and second wavelengths for passing light through each egg being tested; detector means positioned in optical relationship with said light source for producing a first signal in response to light at said first wavelength and corresponding to the intensity of light from said source passing through each egg being tested at said first wavelength, said detector means further producing a second signal in response to light at said second wavelength and corresponding to the intensity of light from said source passing through each egg being tested at said second wavelength; circuit means including photosensitive means positioned in optical relationship with said source for producing a signal corresponding to the intensity of light passing through the egg being tested and further including an electronic discharge device coupled to said detector means for automatically compensating at least one of said first and second signals for differences in the intensity of light passed through the egg resulting from variations of color and thickness of the shell of each of the eggs being tested; and circuit means electrically coupled to said detector means and responsive to at least said second signal for producing an indication of the presence or absence of blood in each egg being tested.

8. Apparatus for detecting the presence of blood in eggs wherein the eggs pass substantially the same intensity of light at a first wavelength whether or not blood is in the eggs and wherein the eggs pass a different intensity of light at a second wavelength of the order of 575 millimicrons for eggs having blood spots than for eggs not having blood spots and wherein the first wavelength is different from the second wavelength, said apparatus including: a source providing light at least of said first and second wavelengths for passing light through each egg being tested; filter means positioned to be operative upon the light from the source as transmitted through each egg being tested for obtaining the transmission from each egg being tested of light at the first and second wavelengths; detector means positioned in optical relationship with said filter means for producing a first signal in response to light at said first wavelength and corresponding to the intensity of light from said source passing through each egg being tested at said first wavelength, said detector means further producing a second signal in response to light at said second wavelength and corresponding to the intensity of light from said source passing through each egg being tested at said second wavelength; circuit means including photosensitive means positioned in optical relationship with said source for producing a signal corresponding to the intensity of light passing through the egg being tested and further including an electronic discharge device coupled to said detector means for automatically compensating at least one of said first and second signals for differences in the intensity of light passed through the egg resulting in variations of color and thickness of the shell of each of the eggs being tested, circuit measn electrically coupled to said detector means and responsive to at least said second signal for producing a control signal indicative of the presence or absence of blood in each egg being tested; and means including solenoid means coupled to said circuit means and responsive to said control signal for producing a control effect in the presence of blood in any egg being tested.

References Cited in the file of this patent

UNITED STATES PATENTS

| | | |
|---|---|---|
| 2,152,645 | Holven et al. | Apr. 4, 1939 |
| 2,218,253 | Weaver | Oct. 15, 1940 |
| 2,356,238 | Gillette et al. | Aug. 22, 1944 |
| 2,678,725 | Jacobson | May 18, 1954 |
| 2,700,321 | Brant et al. | Jan. 25, 1955 |
| 2,759,392 | Sweet | Aug. 21, 1956 |
| 2,823,800 | Bliss | Feb. 18, 1958 |